United States Patent [19]
Karam et al.

[11] Patent Number: 5,531,928
[45] Date of Patent: Jul. 2, 1996

[54] PHOSPHOR AND METHOD OF MAKING SAME

[75] Inventors: Ronald E. Karam, Towanda; Vaddi B. Reddy, Sayre; Shellie K. Northrop, Sayre; Yan Zhang, Sayre, all of Pa.

[73] Assignee: Osram Sylvania Inc., Danvers, Mass.

[21] Appl. No.: 444,476

[22] Filed: May 9, 1995

Related U.S. Application Data

[60] Division of Ser. No. 189,012, Jan. 28, 1994, abandoned, which is a continuation-in-part of Ser. No. 999,637, Dec. 31, 1992, abandoned.

[51] Int. Cl.$^6$ .......................... C09K 11/59; C09K 11/55
[52] U.S. Cl. .......................... 252/301.4 F; 252/301.4 R; 252/301.4 H
[58] Field of Search ............ 252/301.4 F, 301.4 H, 252/301.4 R

[56] References Cited

U.S. PATENT DOCUMENTS

| | | | |
|---|---|---|---|
| 3,149,947 | 9/1964 | Eppler et al. | 65/33 |
| 3,149,982 | 9/1964 | Eppler | 106/39 |
| 5,032,547 | 7/1991 | Giannelis et al. | 252/512 |
| 5,185,180 | 2/1993 | Kasenga et al. | 427/67 |
| 5,306,441 | 4/1994 | Reddy et al. | 252/301.4 F |

FOREIGN PATENT DOCUMENTS

| | | | |
|---|---|---|---|
| 2307863 | 12/1976 | France | 252/301.4 F |

OTHER PUBLICATIONS

J. Gopalakrishnan and V. Bhat, *Inorganic Chemistry*, 26, 4299–4301 (1987).

M. Sato, J. Abo, T. Jin and M. Ohta, *Solid State Ionics*, 51, 85–89 (1992).

J. Gopalakrishnan and V. Bhat, *Mat. Res. Bull.*, 22, 413–417 (1987).

W. Eitel, R. Hatch, M. Denny, *J. Amer. Cer. Soc.*, 36, 341–348 (1953).

K. Kuroda, M. Ogawa, T. Yanagisawa, & C. Kato, Layered Inorganic–Organic Nanocomposites: Application to Photofunctional Materials and Conversion to Inorganic Micropourous Materials, Nanophase and Nanocomposite Materials Symposium, Dec. 1–3 1992, Boston, MA, pp. 335–347.

K. Kitajima, K. Miyake, & N. Takusagawa, Changes in Swelling Characteristics and Structure of Na–Fluorine Micas with Ga– and Al– Substitutions, J. Ceramic. Soc. Jpn. Int. Ed., 1991, 99(12), pp. 1174–1182.

K. Kitajima and N. Daimon, Synthesis of Na–Fluor–Tetrasilicic Mica [$NaMg_{2.5}(Si_4O_{10})F_2$] and its Swelling Characteristics, Nippon Kagaku Kaishi, (6), pp. 991–995 (1975).

H. Shell and K. Ivey, Fluoromicas, Bureau of Mines, U.S. Dept. of Interior Bulletin 647, pp. 123–144 (1969).

*Primary Examiner*—Melissa Bonner
*Attorney, Agent, or Firm*—Robert F. Clark

[57] ABSTRACT

Electroluminescent phosphors having substantially increased luminance and maintenance over that of prior art electroluminescent phosphors may be made by (1) doping an inorganic intercalation compound having an atomic structure interspersed with vacant spaces, with selected activator ions capable of luminescent emission, and (2) introducing organic monomers or other conductive material into the vacant spaces of the atomic structure of the doped inorganic intercalation compound. The organic monomers may be polymerized in situ to form conductive polymers therein.

34 Claims, 3 Drawing Sheets

PHOSPHOR AND METHOD OF MAKING SAME

The United States Government has rights in this invention pursuant to U.S. Government Contract No. DAAL01-92-C-0241.

CROSS-REFERENCE TO RELATED APPLICATIONS

This application is a division of application Ser. No. 08/189,012, filed Jan. 28, 1994, now abandoned, which is a continuation-in-part of application Ser. No. 07/999,637, filed Dec. 31, 1992, now abandoned, and assigned to the assignee of the instant invention. This application is related to copending application Ser. Nos. 08/425,849, 08/425,848, 08/425,535 and 08/425,536, all filed Apr. 20, 1995.

TECHNICAL FIELD

This invention relates to phosphors and methods of making them. In particular, it relates to methods of making electroluminescent phosphors by providing an inorganic intercalation compound characterized by an atomic structure interspersed with vacant spaces of sufficient size to accommodate foreign atoms or molecules within them; doping the inorganic intercalation compound with selected activator ions which, when excited by an electric field or other exciting radiation, are capable of luminescent emission; and interposing selected conductive materials into the vacant spaces of the inorganic intercalation compound. It also relates to electroluminescent phosphors and electroluminescent lamps made by this method.

BACKGROUND ART

Electroluminescent lamps typically provide approximately 30 foot-lamberts of illumination and are thus suitable for various low-intensity illumination applications, such as decorative lighting, egress lighting, cockpit and dashboard display panels, and membrane switches. They have also been used as backlighting sources for liquid crystal display (LCD) devices. However, most LCD applications, including black/white and color LCD displays and high definition displays, require greater backlighting illumination than electroluminescent lamps can provide. Furthermore, most electroluminescent lamps have poor maintenance characteristics: they typically degrade to about half their initial brightness within 2000 hours of operation.

Fluorescent lamps, which provide between 2000 and 4000 foot-lamberts of illumination, have been used as illumination sources for these LCD display devices. However, when used in LCD display applications, fluorescent lamps have their own disadvantages. For example, they are bulky. Being made of glass, they are also fragile and thus are unable to withstand rugged environments; if broken, they may release small amounts of mercury. They also do not operate at temperatures below $-20°$ C. In contrast, electroluminescent lamps do not have the disadvantages of size and construction that fluorescent lamps have. They are quite small and thin, light in weight, extremely rugged, and they can operate at temperatures well below $-20°$ C.

To be useful in LCD backlighting applications, electroluminescent phosphors must emit in narrow bands of the blue, green and red zones of the visible spectrum. Specifically, the blue emission wavelength should preferably be between 460–470 nm, the green emission wavelength should preferably be between 535–545 nm, and the red emission wavelength should preferably be between 610–650 nm.

One electroluminescent phosphor which meets the above-described blue emission color requirements for LCD backlighting applications is a blue-emitting copper-activated zinc sulfide phosphor, ZnS:Cu. Zinc sulfide phosphors and methods of making them are described in U.S. Pat. No. 2,807,587 to Butler et al., U.S. Pat. No. 3,031,415 to Morrison et al., U.S. Pat. No. 3,031,416 to Morrison et al., U.S. Pat. No. 3,152,995 to Strock, U.S. Pat. No. 3,154,712 to Payne, U.S. Pat. No. 3,222,214 to Lagos et al., U.S. Pat. No. 3,657,142 to Poss, and U.S. Pat. No. 4,859,361 to Reilly et al., all of which are assigned to the assignee of the instant invention. However, notwithstanding their emission color characteristics, none of these electroluminescent zinc sulfide phosphors, nor any other electroluminescent phosphors, are sufficiently bright for use in most LCD backlighting applications or high definition display devices.

It would be an advantage in the art to provide an electroluminescent phosphor having improved luminance and maintenance for use in LCD and high definition display devices, and a method of making the phosphor.

SUMMARY OF THE INVENTION

It is an object of this invention to obviate the disadvantages of the prior art.

It is another object of this invention to provide an electroluminescent phosphor having substantially increased luminance and maintenance over prior art electroluminescent phosphors.

It is another object of this invention to provide a method of making an electroluminescent phosphor having substantially increased luminance and maintenance over prior art electroluminescent phosphors.

These objects are accomplished, in one aspect of the invention, by an electroluminescent phosphor which comprises an inorganic intercalation compound characterized by an atomic structure interspersed with vacant spaces of sufficient size to accommodate foreign atoms or molecules within them, wherein the inorganic intercalation compound has been (1) doped with selected activator ions which are capable of luminescent emission when excited by an electric field or other exciting radiation, and (2) interposed with conductive organic polymers or other conductive material within the vacant spaces of the doped inorganic intercalation compound.

These objects are accomplished, in another aspect of the invention, by a method of making an electroluminescent phosphor, comprising the steps of: providing an inorganic intercalation compound characterized by an atomic structure interspersed with vacant spaces of sufficient size to accommodate foreign atoms or molecules within them; doping the inorganic intercalation compound with selected activator ions which are capable of luminescent emission when excited by an electric field or other exciting radiation to obtain a doped inorganic intercalation compound; and interposing selected conductive materials into the vacant spaces of the doped inorganic intercalation compound.

BEST MODE FOR CARRYING OUT THE INVENTION

Figure 1:
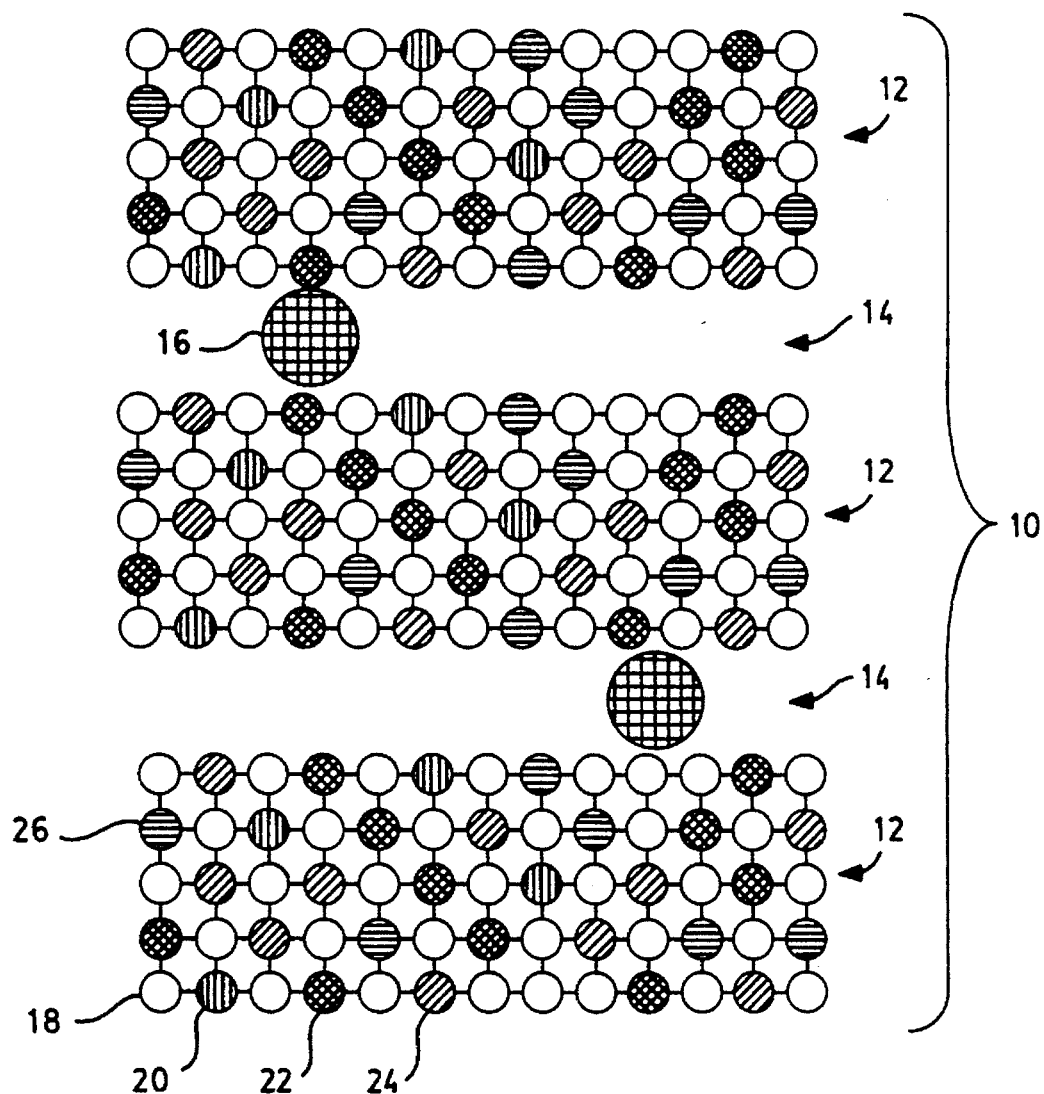
FIG. 1 is a schematic diagram representing the approximate atomic structure of fluorophlogopite, an inorganic intercalation compound.

For a better understanding of the present invention, together with other and further objects, advantages and capabilities thereof, reference is made to the following specification and appended claims.

Electroluminescent phosphors having substantially increased luminance over that of prior art electroluminescent phosphors may be made by doping an inorganic intercalation compound, characterized by an atomic structure interspersed with vacant spaces of a sufficient size to accommodate foreign atoms or molecules within them, with selected activator ions which are capable of luminescent emission when excited by an electric field or other exciting radiation. Conductive materials, such as, for example, mercury, or selected organic monomers which become conductive when polymerized, may then be interposed into the vacant spaces of the atomic structure of the doped inorganic intercalation compound. The organic monomers may then be polymerized in situ to form conductive polymers therein which may effect an expansion of the conductive volume of the doped inorganic intercalation compound. The result is an electroluminescent phosphor which may have substantially greater luminance than that of prior art electroluminescent phosphors.

Inorganic intercalation compounds are known. They generally have an atomic structure characterized by the presence of ionically bonded atoms in substructures interspersed with vacant spaces which are sufficiently large to accommodate foreign atoms or molecules within them. Intercalation compounds are generally of three types: lamellar, or layered, compounds; channel-type compounds; and cage-type compounds.

In lamellar intercalation compounds the atomic substructures comprise layers, or lamellae, of ionically bonded inorganic atoms. The lamellae themselves are bonded together by relatively weak forces, known as Van der Waals forces. The relatively weak Van der Waals forces between the lamellae permit the entry of foreign atoms or molecules into the spaces (hereinafter referred to as "Van der Waals spaces") between the lamellae. The Van der Waals spaces in lamellar intercalation compounds are large enough to accommodate foreign atoms or molecules which may be introduced by various methods, such as, for example, ion exchange, diffusion, acid-base reactions and electrochemical reactions.

In channel-type intercalation compounds the atomic substructures comprise zones of ionically bonded inorganic atoms which are interspersed with networks of vacant channels which are sufficiently large to accommodate foreign atoms or molecules within them. In cage-type intercalation compounds the atomic substructures of ionically bonded atoms are interspersed with vacant holes, or cages, which are sufficiently large to accommodate foreign atoms or molecules within them. The vacant channels or cages are interspersed throughout the atomic structure of the intercalation compound.

The lamellae of a crystal of a lamellar inorganic intercalation compound are generally parallel to the long axis of the crystal, whereas the channels of a channel-type inorganic intercalation compound crystal, and the cages or holes of a cage-type crystal, may be more randomly oriented.

Suitable inorganic intercalation compounds include vermiculites, micas, fluoromicas, xerogels (such as, for example, vanadium pentoxide made by sol-gel processing), iron oxychloride, zirconium phosphates, and zeolites.

Vermiculite is a lamellar intercalation compound which has the idealized general formula $(Ca,Mg)_{x/2}(Mg,Fe,Al)_3[(Al,Si)_4O_{10}](OH)_2$, where the first listed calcium and magnesium ions are exchangeable cations which reside in the interlamellar Van der Waals spaces, and x is any integer. Mica is another type of lamellar intercalation compound having the general idealized formula $M_x(Si_4O_{10})(OH)_2$, where M is an exchangeable cation, typically aluminum or magnesium, and x is any integer. Fluoromicas, which are similar in structure to vermiculites, have the general idealized formula $(Ca,Mg)_{x/2}(Mg,Fe,Al)_3[(Al,Si)_4O_{10}]F_2$. An example of a fluoromica is fluorophlogopite, which has the general formula $KMg_3(Si_3Al)O_{10}F_2$.

FIG. 1 is a schematic representation of the lamellar atomic structure of fluorophlogopite. Fluorophlogopite 10 is comprised of atoms of oxygen 18, aluminum 20, silicon 22, magnesium 24 and fluorine 26 which are ionically bonded together into atomic substructures 12. Between the atomic substructures 12 are Van der Waals spaces 14 in which reside potassium atoms 16.

Zirconium phosphates have the general formula $Zr(MPO_4)_2 \cdot xH_2O$, where M is a monovalent exchangeable cation and x is any integer.

Zeolites are crystalline aluminosilicate intercalation compounds having an atomic structure which is interspersed with networks of channels and/or cages filled with exchangeable cations and water. Zeolites have the general formula $M_xD_y(Al_{x+2y}Si_{n-(x+2y)}O_{2n}) \cdot mH_2O$, where M is a monovalent or divalent exchangeable cation and x and y are any integers. The channels and/or cages within the zeolite structure are sufficiently large to accommodate foreign atoms or molecules within them, including organic polymers, which may be introduced by the previously described methods.

The inorganic intercalation compounds are first doped with selected activator ions which are capable of luminescent emission under cathodoluminescent, fluorescent, x-ray or electroluminescent excitation. The following table lists several activator ions suitable for doping, along with the probable emission color from each. The precise emission colors obtained will depend on the site occupied by the particular activator ion in the lattice of the inorganic intercalation compound.

TABLE 1

| ACTIVATOR ION DOPANTS AND THEIR EMISSION COLORS | | |
| --- | --- | --- |
| RED | GREEN | BLUE |
| $Mn^{+2}$ | $Mn^{+2}$ | $Sb^{+3}$ |
| $Mn^{+4}$ | $Eu^{+2}$ | $Ti^{+4}$ |
| $Fe^{+3}$ | $Tb^{+3}$ | $Sn^{+2}$ |
| $Eu^{+3}$ | | $Tm^{+3}$ |
| $Sm^{+3}$ | | $Eu^{+2}$ |
| $Cr^{+3}$ | | $Ce^{+3}$ |

The activator ions may be doped into the atomic lattice of the inorganic intercalation compound by several methods, including high-temperature solid-state synthesis (generally in excess of 1000° C.), hydrothermal synthesis, wet-chemical procedures and low-temperature procedures. The activator ions generally occupy lattice sites within the atomic structure of the inorganic intercalation compound. For example, when an inorganic intercalation compound, such as fluorophlogopite, is doped with manganese ions, the manganese ions replace a small fraction of the magnesium ions in the fluorophlogopite atomic structure.

Fluxing agents, such as, for example, sodium chloride or barium chloride, may be used during the doping process, although they are not generally required.

The doped inorganic intercalation compound may be excited with, for example, cathode ray or ultraviolet radiation (since most electroluminescent materials are also cathodoluminescent and/or photoluminescent), to determine its luminescence intensity and its emission color. Luminescence intensity of the doped inorganic intercalation compound may be optimized by varying the amounts of the desired dopant ions.

Conductive materials, such as mercury, or selected organic monomers which are capable of becoming conductive when polymerized, such as aniline and pyrrole, may then be introduced into the vacant spaces of the atomic structure of the doped inorganic intercalation compound. If organic monomers are used, they may then be polymerized in situ to form conductive organic polymers. The conductive polymers may be formed in several ways, including the single polymerization of each organic monomer, the successive, multiple polymerizations of each organic monomer, and the addition of functional groups to an organic monomer to effect cross-linking of the monomer chains. The last two methods, successive polymerization and the addition of functional groups to the monomer, may effect a swelling of the polymer-filled spaces in the inorganic intercalation compound.

Figure 2:
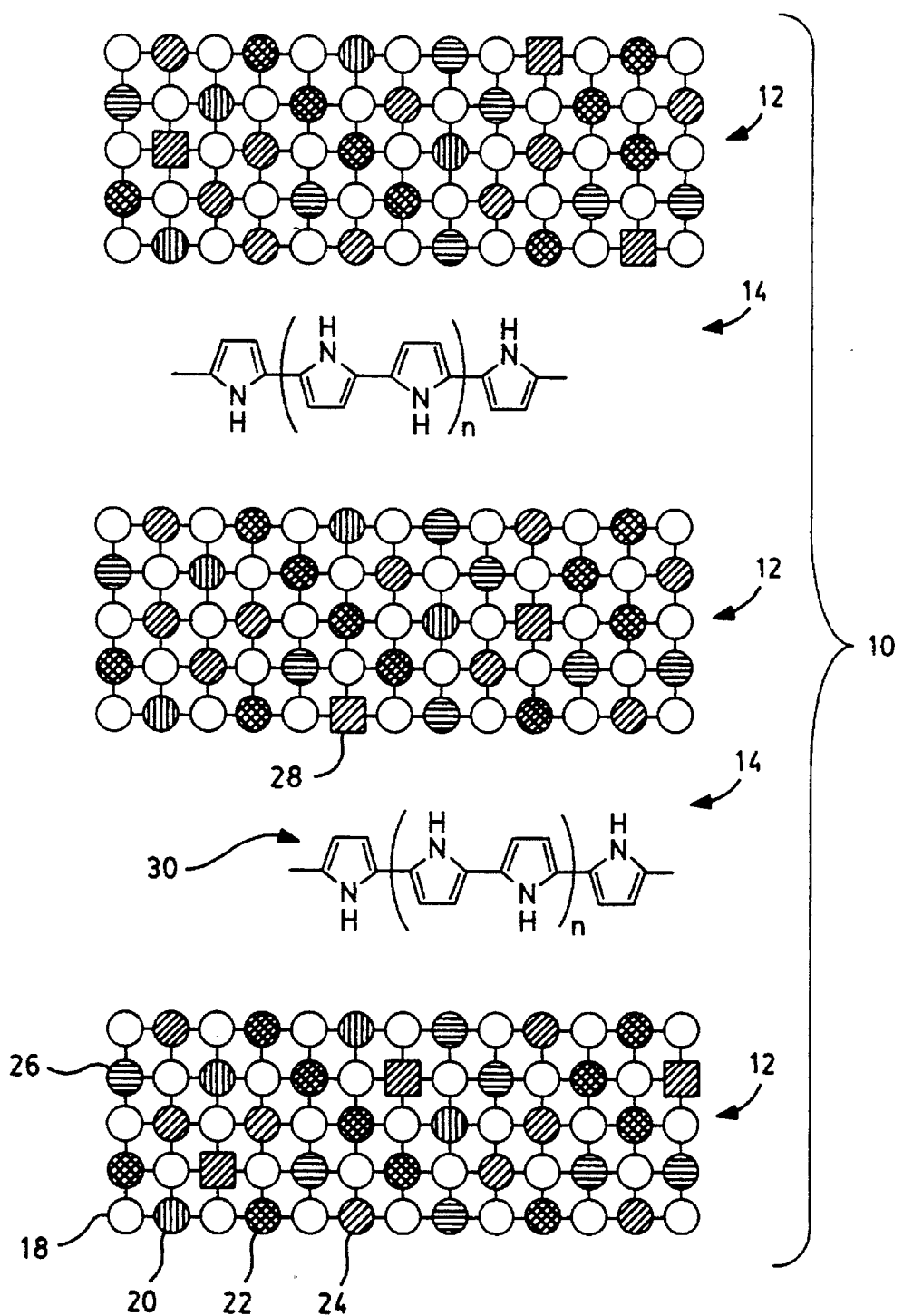
FIG. 2 is a schematic diagram representing the approximate atomic structure of fluorophlogopite which has been doped with manganese activator ions and interposed with polypyrrole polymers, the monomers of which were previously introduced into the interlamellar Van der Waals spaces of the fluorophlogopite.

FIG. 2 is a schematic representation of fluorophlogopite 10 which has been doped with manganese ions 28 and interposed with pyrrole monomers 30 into the Van der Waals spaces 14.

The following equations are illustrative of the chemical reactions that occur during synthesis of an electroluminescent phosphor according to the method of this invention. In this illustrative example, the inorganic intercalation compound is a vermiculite and the conductive polymer is polyaniline.

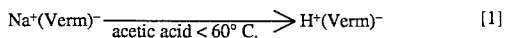  [1]

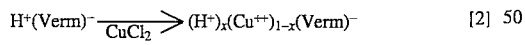  [2]

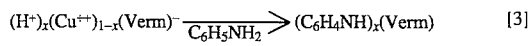  [3]

In Equation [1], a vermiculite having sodium as the exchangeable monovalent cation occupying the Van der Waals spaces is contacted with acetic acid at a temperature of less than 60° C. Monovalent hydrogen ions, $H^+$ (or hydronium ions, $H_3O^+$), replace the sodium ions in the Van der Waals spaces of the vermiculite.

In Equation [2], the vermiculite containing hydrogen or hydronium as the exchangeable monovalent cation is contacted with a copper chloride solution. In the presence of copper chloride, some of the monovalent ions in the vermiculite are replaced with divalent copper ions.

In Equation [3], the vermiculite containing both monovalent hydrogen (or hydronium) ions and divalent copper ions is reacted with aniline. The aniline enters the Van der Waals spaces of the vermiculite in an acid-base reaction with the monovalent cation. In the presence of the divalent copper ions the aniline will polymerize to form conductive polyaniline in the Van der Waals spaces of the vermiculite.

The result of polymerization of selected organic monomers will be the interposition of conductive polymers into the vacant spaces of the intercalation compound. Under certain polymerization conditions, an expansion of the conductive volume of the intercalation compound may also occur. When lamellar intercalation compounds, such as vermiculites, are used, polymerization of the organic monomer will occur in the interlamellar Van der Waals spaces of the intercalation compound. When channel-type or cage-type intercalation compounds, such as zeolites, are used, polymerization of the organic monomer will occur within the vacant channels or cages interspersed throughout the atomic structure of the intercalation compound.

When particles of an electroluminescent phosphor made by the method of this invention are exposed to an electric field, the electric field will concentrate across the insulating portions of the particles which contain the activator ions capable of luminescent emission, since the conductive portions will not support an electric field. The activator ions will luminesce very efficiently when exposed to a highly concentrated electric field.

To increase the conductive volume of the doped inorganic intercalation compound and thereby increase luminance, particularly in lamellar intercalation compounds characterized by the presence of Van der Waals spaces, polymerization of the organic monomer in three dimensions may be desirable. For example, to effect polymerization of aniline in three dimensions, some of the hydrogen atoms on the phenyl group ($C_6H_5$) may be replaced with a carboxylic acid group (COOH). Alternatively, some of the hydrogen atoms of the phenyl group of the aniline molecule may be replaced with both carboxylic acid and amine groups ($NH_2$) to crosslink the conductive polymer chains through the formation of peptide linkages. The conductivity of the polymer should not be adversely affected by the substitution of these alternative functional groups in the polymer backbone. Alternatively, swelling of the conductive volume of the doped inorganic intercalation compound may be achieved by successive monomer-to-polymer conversions within the vacant spaces of the intercalation compound.

Figure 3:
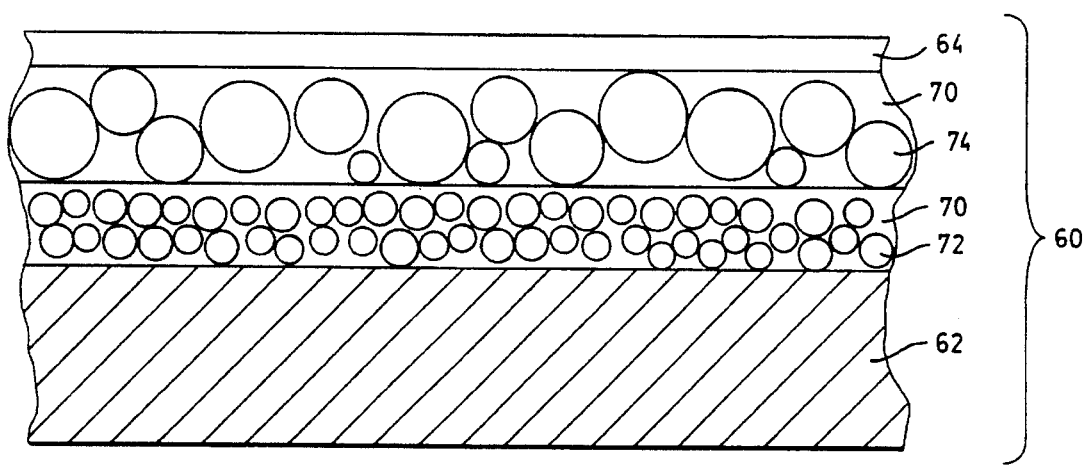
FIG. 3 is a schematic representation of the structure of an electroluminescent lamp.

FIG. 3 is a schematic representation of the structure of an electroluminescent lamp 60. A conductive substrate material, such as aluminum or graphite, forms a first electrode 62 of the lamp 60, while a transparent conductive film, such as indium tin oxide, forms a second electrode 64. Sandwiched between the two conductive electrodes 62 and 64 are two additional layers of dielectric material 70 which can be, for example, cyanoethyl cellulose or cyanoethyl starch. Adjacent to the first electrode 62 is a layer of dielectric material 70 in which may be embedded particles of a ferroelectric material 72. Adjacent to the second electrode 64 is a layer of dielectric material 70 in which may be embedded particles of the electroluminescent phosphor 74 of this invention.

The luminance of an electroluminescent phosphor made by the method of this invention may be equivalent to that obtained from commercially available fluorescent lamps.

Layered perovskite compounds such as $KLaNb_2O_7$ and $KCa_2Nb_3O_{10}$ may also be used as lamellar intercalation compounds. The structures of these materials consist of perovskite-like layers which are derived from a cubic arrangement of corner-shared $NbO_6$ octahedra with the calcium and lanthanum atoms occupying the twelve-coordinate sites at the center of each cube. The potassium atoms are located between the layers and can be readily ion exchanged. The protonated form of these compounds are Brönsted acids and can readily react with organic bases such as primary alkylamines to form intercalation compounds with large interlayer expansions.

Luminescent forms of these compounds were created by doping the compounds with europium and samarium. In particular, $KLaNb_2O_7$:Eu, $KLaNb_2O_7$:Sm and $KCa_2Nb_3O_{10}$:Eu phosphors were prepared. These materials were found to have red emissions under ultraviolet (UV) light and cathode ray (CR) excitations. These materials may also be rendered electroluminescent after being intercalated with conductive materials such as conductive polymers.

Other layered perovskite materials capable of acting as intercalation compounds include $K_2La_2Ti_3O_{10}$, and $K_2La_{2-x}Gd_xTi_3O_{10}$. These materials may also be rendered luminescent by doping with activator ions. In particular, red-emitting $K_2La_2Ti_3O_{10}$, and $K_2La_{2-x}Gd_xTi_3O_{10}$ were made by doping these compounds with europium activator ions. These phosphors have red emissions under UV and CR excitation and also may be rendered electroluminescent after being intercalated with conductive polymers.

Other activator ions which may be used to create luminescent forms of intercalation compounds include niobium and zirconium. Blue-white emitting niobium-activated fluorophlogopite and sodium fluorophlogopite, $NaMg_{3-2.5x}(Si_3Al)O_{10}F_2$:$Nb_x$, compounds have been prepared as well as a UV-blue emitting zirconium-activated fluorophlogopite. These phosphors emit a bluish-white or blue light under UV and CR excitation. Such emissions are thought to be a result of charge transfer in the $NbO_6$ and zirconate structures.

The following non-limiting examples are presented. Brightness measurements were made by placing a layer of phosphor on a 1.5×1.5" glass slide, exciting the phosphor with cathode ray (CR) radiation at about 15 kV, 8 μA and measuring the luminescent emission with a photomultiplier tube. Ultraviolet (UV) radiation from a mercury vapor discharge was also used to excite the phosphors. The weights of all raw materials are given in grams.

EXAMPLES 1–4

Several blue-white emitting niobium-activated fluorophlogopite phosphor samples having the general formula $KMg_3(Si_3Al)O_{10}F_2$:Nb were prepared by forming a mixture of potassium carbonate ($K_2CO_3$, 4.7 grams), aluminum oxide ($Al_2O_3$, 10.2 grams), magnesium oxide (MgO, 24.19 grams), silicon dioxide ($SiO_2$, 32.02 grams), potassium hexafluorosilicate ($K_2SiF_6$, 14.75 grams) and varying amounts of niobium oxide ($Nb_2O_5$, 0 moles; 0.266 grams or 0.01 moles; 0.532 grams or 0.02 moles; and 1.329 grams or 0.05 moles). The mixtures were blended on a mechanical blender for 10–60 minutes until uniformly mixed. The uniform mixtures were then charged into alumina crucibles and fired in an air atmosphere in an electric furnace at about 1200° C. for about 12 hours to form a fired cake. The fired cakes were pulverized, sieved, and, if necessary, washed to obtain the finished phosphor. The phosphor samples were then evaluated for luminescence by exciting them with CR and/or UV(254 nm) radiation. The niobium-activated fluorophlogopite samples were blue-white emitting with an emission maximum at about 490 nm. The unactivated sample exhibited no significant blue-white emission and had a brightness of about 0.2 Ft.L. The intensity of the luminescence of the activated samples increased with increasing niobium concentration. The sample having 0.05 moles of niobium per mole of fluorophlogopite had the greatest brightness at about 1.6 Ft.L.

EXAMPLES 5–9

A second set of blue-white emitting niobium-activated fluorophlogopite phosphor samples was prepared in which the lattice charge was compensated for by removing 2.5 $Mg^{+2}$ ions for each $Nb^{+5}$ ion added. These phosphors, which have the general formula $KMg_{3-2.5x}Nb_x(Si_3Al))O_{10}F_2$ where x is between 0.005 and 0.20, were prepared similarly to the Examples 1–4 by combining the raw materials in the amounts used in Examples 1–4 except that both the amounts of magnesium oxide and niobium oxide were varied. The amounts of magnesium oxide and niobium oxide used are given in the following table.

|  | Example 5 | Example 6 | Example 7 | Example 8 | Example 9 |
|---|---|---|---|---|---|
| MgO | 24.08 g | 23.98 g | 23.18 g | 22.17 g | 20.15 g |
| $Nb_2O_5$ | 0.133 g | 0.266 g | 1.329 g | 2.652 g | 5.316 g |
| (moles of Nb/mole phosphor) | (0.005) | (0.01) | (0.05) | (0.10) | (0.20) |

The phosphor samples were evaluated for luminescence by exciting them with CR and/or UV(254 nm) radiation. The charge compensated niobium-activated fluorophlogopite samples were blue-white emitting with an emission maximum at 490 nm. Optimum brightness was obtained at 0.10 mole of niobium per mole of fluorophlogopite (about 2.5 Ft.L.).

EXAMPLES 10–14

A third set of blue-white emitting niobium-activated fluorophlogopite phosphor samples was prepared in which the lattice charge was compensated for by adding three $Li^{+1}$ ions and removing four $Mg^{+2}$ ions for each $Nb^{+5}$ ion added. These phosphors, which have the general formula $KMg_{3-4x}Nb_xLi_{3x}(Si_3Al)O_{10}F_2$ where x is between 0.005 and 0.20, were prepared similarly to the Examples 1–4. The lithium ions were added in the form of lithium carbonate. Most of the raw materials were combined in the amounts used in Examples 1–4, 4.7 grams of potassium carbonate, 10.20 grams of aluminum oxide, 32.02 grams of silicon dioxide and 14.75 grams of potassium hexafluorosilicate. The amounts of magnesium oxide, niobium oxide and lithium carbonate were added in varying amounts. These amounts are given in the following table.

|  | Example 10 | Example 11 | Example 12 | Example 13 | Example 14 |
|---|---|---|---|---|---|
| MgO | 24.02 g | 23.86 g | 22.89 g | 20.96 g | 17.73 g |
| $Nb_2O_5$ | 0.133 g | 0.266 g | 1.063 g | 2.658 g | 5.316 g |
| $Li_2CO_3$ | 0.144 g | 0.222 g | 0.8867 g | 2.217 g | 4.433 g |
| (moles of Nb/mole phosphor) | (0.005) | (0.01) | (0.04) | (0.10) | (0.20) |

The phosphor samples were evaluated for luminescence by exciting them with CR and/or UV(254 nm) radiation. The niobium-activated fluorophlogopite samples charge compensated with lithium were blue-white emitting with an emission maximum at 490 nm. Optimum brightness was obtained at about 0.04 mole of niobium per mole of fluorophlogopite (about 2.3 Ft.L.). In general, these phosphors provided higher luminescence than the defect-type niobium-activated fluorophlogopite samples of Examples 1–4 (excess cations) and the charge compensated niobium-activated fluorophlogopite samples of Examples 5–9 (fewer cations).

All of the phosphor samples prepared in Examples 1–14 had a platelet morphology.

EXAMPLES 15–18

Red-emitting europium-activated layered perovskite phosphor samples having the general formula $KLaNb_2O_7$:Eu were prepared by forming mixtures of potassium carbonate ($K_2CO_3$, 4.23 grams), niobium oxide ($Nb_2O_3$, 13.29 grams), and varying amounts of lanthanum oxide ($La_2O_3$) and europium oxide ($Eu_2O_3$) to yield europium concentrations of 0.005, 0.01, 0.02 and 0.04 moles of europium per mole of $KLaNb_2O_7$:Eu phosphor. The following table gives the varying amounts of lanthanum oxide and europium oxide added to make to the various samples.

|  | Example 15 | Example 16 | Example 17 | Example 18 |
|---|---|---|---|---|
| $La_2O_3$ | 8.107 g | 8.062 g | 7.974 g | 7.816 g |
| $Eu_2O_3$ | 0.042 g | 0.088 g | 0.175 g | 0.350 g |
| (moles of Eu/mole phosphor) | (0.005) | (0.01) | (0.02) | (0.04) |
| Brightness (foot-lamberts) | 0.8536 | 0.9689 | 0.9228 | 0.8866 |

Potassium carbonate was added in approximately 20 mole percent excess of the amount needed to form the stoichiometric compound to compensate for losses due to volatilization. The mixture was blended in a paint shaker for 30 minutes to form a uniform mixture and then fired in air in a covered alumina crucible. The firing temperature cycle consisted of increasing the furnace temperature from 900° to 1250° C. over a period of 3 hours, holding the temperature at 1250° C. for 24 hours, and then decreasing the temperature from 1250° to 900° C. over a period of 2 hours. The fired caked was cooled to room temperature, pulverized and refired at 1250° C. for about 24 hours. The fired powder was washed with deionized water, filtered, dried at 130° C., and screened through a #325 mesh stainless steel sieve. X-ray diffraction (XRD) analysis of the samples showed them to be essentially single phase materials. The luminescent properties of the samples were measured under CR excitation. Sharp emission peaks due to $Eu^{+3}$ were observed at 592, 616, 628 and 706 nm with the strongest peak being 616 nm. A weak, broad emission peak was observed at 400 nm probably due to $NbO_6$ charge transfer. The preferred concentration of the europium activator is 0.01 moles of europium per mole of $KLaNb_2O_7$:Eu phosphor which had a brightness of 0.9689 Ft.L. A similarly prepared unactivated sample had a brightness of 0.8448 Ft.L.

EXAMPLES 19–23

Red-emitting samarium-activated layered perovskite phosphor samples having the general formula $KLaNb_2O_7$:Sm were prepared by forming a mixture of potassium carbonate ($K_2CO_3$), niobium oxide ($Nb_2O_5$), lanthanum oxide ($La_2O_3$) and samarium oxide ($Sm_2O_3$) in amounts calculated to yield 0.005, 0.01, 0.03, 0.05, and 0.06 moles of samarium per mole of $KLaNb_2O_7$:Sm phosphor. These amounts are given in the following table.

|  | Example 19 | Example 20 | Example 21 | Example 22 | Example 23 |
|---|---|---|---|---|---|
| $K_2CO_3$ | 3.40 g | 3.40 g | 4.20 g | 4.20 g | 4.20 g |
| $Nb_2O_5$ | 10.634 g | 10.634 g | 13.291 g | 13.291 g | 13.291 g |
| $La_2O_3$ | 6.486 g | 6.452 g | 7.902 g | 7.738 g | 7.655 g |
| $Sm_2O_3$ | 0.036 g | 0.071 g | 0.262 g | 0.435 g | 0.521 g |
| (moles of Sm/mole phosphor) | (0.005) | (0.01) | (0.03) | (0.05) | (0.06) |
| Brightness (foot-lamberts) | 0.8478 | 0.8439 | 0.8799 | 0.7980 | 0.7830 |

Approximately 20% mole excess of potassium carbonate was added to compensate for losses due to volatilization. The mixtures were then processed in accordance with the method used for Examples 15–18. XRD analysis of the resultant $KLaNb_2O_7$:Sm phosphor samples showed that they were essentially single phase materials. CR excitation produced sharp emission peaks at 564, 600, 608, 648, 654 and 708 nm with the strongest peaks being 600 and 648 nm. A broad peak was also observed at 402 nm which was probably due to $NbO_6$ charge transfer. The preferred activator concentration for this phosphor is 0.03 moles of samarium per mole of $KLaNb_2O_7$:Sm phosphor. A similarly prepared unactivated sample had a brightness of 0.8162 Ft.L.

EXAMPLES 24–27

Red-emitting europium-activated layered perovskite phosphor samples having the general formula $KCa_2Nb_3O_{10}$:Eu were prepared by forming a mixture of potassium carbonate ($K_2CO_3$, 2.76 grams), niobium oxide ($Nb_2O_5$, 15,945 grams), and varying amounts of calcium carbonate ($CaCO_3$), sodium carbonate ($Na_2CO_3$) and europium oxide ($Eu_2O_3$) in amounts calculated to yield 0.005, 0.01, 0.02, and 0.04 moles of europium per mole of $KCa_2Nb_3O_{10}$:Eu phosphor. The varying amounts of sodium carbonate, calcium carbonate and europium oxide used are given in the following table.

|  | Example 24 | Example 25 | Example 26 | Example 27 |
|---|---|---|---|---|
| $Na_2CO_3$ | 0.011 g | 0.020 g | 0.040 | 0.084 g |
| $CaCO_3$ | 7.970 | 7.908 | 7.836 | 7.720 |
| $Eu_2O_3$ | 0.041 g | 0.074 g | 0.139 g | 0.283 g |
| (moles of Eu/mole phosphor) | (0.005) | (0.01) | (0.02) | (0.04) |
| Brightness (foot-lamberts) | 0.8877 | 0.8254 | 0.8146 | 0.7738 |

Sodium carbonate was added to charge compensate for the replacement of small amounts of $Ca^{+2}$ with $Eu^{+3}$. No excess potassium carbonate was used. The mixtures were then processed in accordance with the procedure used for Examples 15–18. XRD analysis of the resultant $KCa_2Nb_3O_{10}$:Eu phosphor samples showed that they were essentially single phase materials. CR excitation produced sharp emission peaks due at 594, 614, 626 and 706 nm with the strongest peak being 614 nm. A broad peak was also observed at 470 nm which was probably due to $NbO_6$ charge transfer. The preferred activator concentration for this phosphor is 0.005 moles of europium per mole of $KCa_2Nb_3O_{10}$:Eu phosphor. A similarly prepared unactivated sample had a brightness of 0.808 Ft.L.

EXAMPLES 28–32

Blue-emitting europium-activated sodium fluorophlogopite phosphors having the general formula $NaMg_3(Si_3Al)O_{10}F_2$:Eu were prepared by forming a mixture of sodium carbonate ($Na_2CO_3$, 10.60 grams), aluminum oxide ($Al_2O_3$, 10.20 grams), silicon dioxide ($SiO_2$, 32.02 grams) and ammonium hexafluorosilicate (($NH_4)_2SiF_6$, 12.47 grams) and varying amounts of magnesium oxide and europium oxide in amounts calculated to yield europium activator concentrations of 0, 0.02, 0.04, 0.05, and 0.10 moles of europium per mole of fluorophlogopite. The amounts of magnesium oxide and europium oxide used are given in the following table.

|  | Example 28 | Example 29 | Example 30 | Example 31 | Example 32 |
|---|---|---|---|---|---|
| MgO | 24.18 g | 24.02 g | 23.86 g | 23.78 g | 23.37 g |
| $Eu_2O_3$ (moles of Eu/mole phosphor) | 0.0 g (0.0) | 0.704 g (0.02) | 1.40 g (0.04) | 1.760 g (0.05) | 3.52 g (0.10) |

Although europium oxide was used as the source of the activator ion, other suitable europium compounds such as europium fluoride or europium chloride could be used.

The mixture was then blended on a mechanical blender for 10–40 minutes until uniformly mixed. The uniform mixtures were charged into covered alumina crucibles and the covered crucibles were inserted into larger crucibles filled with charcoal or graphite pellets. The uniform mixtures were then fired in an electric furnace at about 1200° C. for about 12 hours to form a fired cake. The actual firing program used involved increasing the furnace temperature from 1100° to 1200° C. over a period of 1.5 hours, holding the temperature at 1200° C. for 12 hours and decreasing the furnace temperature from 1200° to 250° C. over a period of 1.0 hours. Although a slightly reducing furnace atmosphere is preferred, these phosphors can also be synthesized in air. After cooling to room temperature, the fired cakes were then pulverized, washed, if necessary, and then sieved through at least a −200 mesh screen to obtain the finished phosphor. The samples were checked for the formation of sodium fluorophlogopite by XRD and all samples were found to be essentially pure sodium fluorophlogopite. The phosphor samples were then evaluated for luminescence by exciting them with CR and/or UV(254 nm) radiation. Under CR excitation, the europium-activated sodium fluorophlogopite samples were blue emitting with a broad band emission with a maximum at about 408 nm. Under UV excitation, the broad band maximum occurred at 418 nm. The unactivated sample exhibited no significant blue emission. The blue emission in these phosphors is attributable to $Eu^{+2}$. The samples having 0.04–0.05 moles of europium per mole of fluorophlogopite had the greatest intensity and were comparable in brightness to the blue-emitting Sylvania type 2162 $Sr_2P_2O_7$:Eu phosphor used in photocopy applications. The measured brightness of the $Sr_2P_2O_7$:Eu phosphor under UV excitation was 17.9 μW/cm$^2$ compared with 14.78 and 14.43 μW/cm$^2$ for the europium activated sodium fluorophlogopite samples having 0.05 and 0.04 moles of activator.

EXAMPLES 33–37

Blue-white emitting niobium-activated sodium fluorophlogopite phosphors having the general formula $NaMg_{3-2.5x}(Si_3Al)O_{10}F_2:Nb_x$ were prepared by forming a mixture of sodium carbonate ($Na_2CO_3$, 10.60 grams), aluminum oxide ($Al_2O_3$, 10.20 grams), silicon dioxide ($SiO_2$, 32.02 grams) and ammonium hexafluorosilicate (($NH_4)_2SiF_6$, 12.47 grams) and varying amounts of magnesium oxide and niobium oxide in amounts calculated to yield niobium activator concentrations of 0, 0.01, 0.02, 0.04, and 0.08 moles of niobium per mole of fluorophlogopite. The amounts of magnesium oxide and niobium oxide used are given in the following table.

|  | Example 33 | Example 34 | Example 35 | Example 36 | Example 37 |
|---|---|---|---|---|---|
| MgO | 24.18 g | 23.98 g | 23.78 g | 23.38 g | 22.57 g |
| $Nb_2O_5$ (moles of Nb/mole phosphor) | 0.0 g (0.0) | 0.266 g (0.01) | 0.532 g (0.02) | 1.06 g (0.04) | 2.126 g (0.08) |
| Brightness (foot-lamberts) | 0.865 | 1.223 | 1.377 | 1.588 | 1.640 |

For every $Nb^{+5}$ ion added, 2.5 $Mg^{+2}$ ions were removed to compensate the lattice charge. This yields a defect structure with missing ions in the octahedral $Mg^{+2}$ sites.

The mixtures were then blended in plastic bottles for 20 minutes on a paint shaker until uniformly mixed. The uniform mixtures were loaded into 250 ml alumina crucibles and fired in air in an electric furnace at about 1200° C. for about 12 hours to form a fired cake. The actual firing program used involved increasing the furnace temperature from 1100° to 1200° C. over a period of 1.5 hours, holding the temperature at 1200° C. for 12 hours and decreasing the furnace temperature from 1200° to 250° C. over a period of 1.0 hours. After cooling to room temperature, the fired cakes were then pulverized, sieved, and washed, if necessary, to obtain the finished phosphor. The phosphor samples were then evaluated for luminescence by exciting them with CR and/or UV(254 nm) radiation. Under both CR and UV (254 nm) excitation, the niobium-activated sodium fluorophlogopite samples were blue-white emitting with an emission maximum at about 495 nm. The luminescence of the phosphor samples increased with increasing niobium concentration with the phosphor having 0.08 moles of niobium per mole of fluorophlogopite having the greatest luminescence.

EXAMPLES 38–42

Red-emitting europium-activated layered perovskite phosphor samples having the general formula $K_2La_2Ti_3O_{10}$:Eu were prepared by forming mixtures of potassium carbonate ($K_2CO_3$, 6.63 grams), titanium dioxide ($TiO_2$, 9.59 grams), and varying amounts of lanthanum oxide ($La_2O_3$) and europium oxide ($Eu_2O_3$) to yield europium concentrations of 0.005, 0.01, 0.02, 0.03 and 0.04 moles of europium per mole of $K_2La_2Ti_3O_{10}$:Eu phosphor. The following table gives the varying amounts of lanthanum oxide and europium oxide added to make to the various samples.

|  | Example 38 | Example 39 | Example 40 | Example 41 | Example 42 |
|---|---|---|---|---|---|
| $La_2O_3$ | 13.00 g | 12.97 g | 12.90 | 12.84 g | 12.77 g |
| $Eu_2O_3$ (moles of Eu/mole phosphor) | 0.0348 g (0.005) | 0.0700 g (0.01) | 0.1410 (0.02) | 0.2110 g (0.03) | 0.2820 g (0.04) |
| Brightness (foot-lamberts) | 1.096 | 1.085 | 1.110 | 1.095 | 1.095 |

Potassium carbonate was added in approximately 20 mole percent excess of the amount needed to form the stoichiometric compound to compensate for losses due to volatilization. The mixture was blended in a paint shaker for 30 minutes to form a uniform mixture and then fired in air in a covered alumina crucible. The firing temperature cycle consisted of increasing the furnace temperature from 700° to 1100° C. over a period of 3 hours, holding the temperature at 1100° C. for 24 hours, and then decreasing the temperature from 1100° to 700° C. over a period of 2 hours. The fired caked was cooled to room temperature, pulverized and refired at 1100° C. for about 24 hours. The fired powder was washed with deionized water, filtered, dried at 130° C., and screened through a #325 mesh stainless steel sieve. The luminescent properties of the samples were measured under both CR and UV excitation. Sharp emission peaks were observed at 594, 617 and 702 nm with the strongest peak being 702 nm. The preferred concentration of the europium activator is 0.02 moles of europium per mole of $K_2La_2Ti_3O_{10}$:Eu phosphor. A similarly prepared unactivated sample had a brightness of 0.750 Ft.L.

EXAMPLES 43–47

Red-emitting europium-activated layered perovskite phosphor samples having the general formula $K_2La_{2-x}Gd_xTi_3O_{10}$:Eu were prepared in a manner similar to the method described for Examples 38–42 by forming mixtures of potassium carbonate ($K_2CO_3$, 6.63 grams), titanium dioxide ($TiO_2$, 9.59 grams), and varying amounts of lanthanum oxide ($La_2O_3$), gadolinium oxide ($Gd_2O_3$) and europium oxide ($Eu_2O_3$) to yield europium concentrations of 0.005, 0.01, 0.03, 0.04 and 0.05 moles of europium per mole of $K_2La_{2-x}Gd_xTi_3O_{10}$:Eu phosphor. The following table gives the varying amounts of lanthanum oxide, gadolinium oxide and europium oxide added to make to the various samples.

|  | Example 43 | Example 44 | Example 45 | Example 46 | Example 47 |
| --- | --- | --- | --- | --- | --- |
| $Gd_2O_3$ | 1.450 g | 1.450 g | 2.18 g | 2.18 g | 2.18 g |
| $La_2O_3$ | 12.97 g | 12.94 g | 10.88 g | 10.82 g | 10.75 g |
| $Eu_2O_3$ | 0.0350 g | 0.0700 g | 0.2110 g | 0.2820 g | 0.3520 g |
| (moles of Eu/mole phosphor) | (0.005) | (0.01) | (0.03) | (0.04) | (0.05) |
| Brightness (foot-lamberts) | 0.810 | 0.870 | 0.943 | 0.987 | 0.939 |

The luminescent properties of the samples were measured under both CR and UV excitation. Sharp emission peaks were observed at 594, 617 and 702 nm with the strongest peak being 702 nm. The preferred concentration of the europium activator is 0.04 moles of europium per mole of $K_2La_{2-x}Gd_xTi_3O_{10}$:Eu phosphor.

EXAMPLES 48–52

Blue-emitting thulium-activated fluorophlogopite phosphors having the general formula $KMg_3(Si_3Al)O_{10}F_2$:Tm were prepared by forming a mixture of potassium carbonate ($K_2CO_3$, 4.70 grams), aluminum oxide ($Al_2O_3$, 10.20 grams), magnesium oxide (MgO, 24.19 grams), silicon dioxide ($SiO_2$, 32.02 grams) and potassium hexafluorosilicate ($K_2SiF_6$, 14.75 grams) and varying amounts of thulium oxide in amounts calculated to yield thulium activator concentrations of 0, 0.005, 0.01, 0.05, and 0.20 moles of thulium per mole of fluorophlogopite. The amounts of thulium oxide used are given in the following table.

|  | Example 48 | Example 49 | Example 50 | Example 51 | Example 52 |
| --- | --- | --- | --- | --- | --- |
| $Tm_2O_3$ | 0.0 g | 0.193 g | 0.386 g | 1.930 g | 7.72 g |
| (moles of Tm/mole phosphor) | (0.0) | (0.005) | (0.01) | (0.05) | (0.20) |
| Brightness (foot-lamberts) | 0.8708 | 0.9797 | 0.9517 | 0.8786 | 0.8614 |

The mixture was then blended on a mechanical blender for 20 minutes until uniformly mixed. The uniform mixtures were charged into covered alumina crucibles and the covered crucibles were inserted into larger covered crucibles filled with charcoal or graphite pellets. The uniform mixtures were then fired in a mildly reducing $CO_2$ atmosphere in an electric furnace at about 1200° C. for about 12 hours to form a fired cake. The actual firing program used involved increasing the furnace temperature from 1100° to 1200° C. over a period of 1.5 hours, holding the temperature at 1200° C. for 12 hours and decreasing the furnace temperature from 1200° to 250° C. over a period of 1.0 hours. Although a slightly reducing furnace atmosphere is preferred, these phosphors can also be synthesized in air. After cooling to room temperature, the fired cakes were then pulverized and sieved through at least a −200 mesh screen to obtain the finished phosphor. Most samples were found to be essentially pure fluorophlogopite by XRD. However, a second minor phase of $Tm_2SiO_5$ was detected in samples prepared with high amounts of thulium. All of the samples exhibited the typical platelet morphology normally observed for fluorophlogopite. The phosphor samples were evaluated for luminescence by exciting them with CR radiation. Under CR excitation, the thulium-activated fluorophlogopite samples were blue-emitting with emission peaks at 360, 450 and 460 nm. The unactivated sample had no blue emission. The unactivated sample had a very weak red emission which is believed to be due to a manganese impurity. The sample having 0.005 moles of thulium per mole of fluorophlogopite had the greatest brightness.

EXAMPLES 53–57

Blue-emitting europium-activated fluorophlogopite phosphors having the general formula $KMg_3(Si_3Al)O_{10}F_2$:Eu were prepared by forming a mixture of potassium carbonate ($K_2CO_3$, 4.70 grams), aluminum oxide ($Al_2O_3$, 10.20 grams), magnesium oxide (MgO, 24.19 grams), silicon dioxide ($SiO_2$, 32.02 grams) and potassium hexafluorosilicate ($K_2SiF_6$, 14.75 grams) and varying amounts of europium oxide in amounts calculated to yield europium activator concentrations of 0, 0.005, 0.01, 0.05, and 0.10 moles of europium per mole of fluorophlogopite. The amounts of europium oxide used are given in the following table.

|  | Example 53 | Example 54 | Example 55 | Example 56 | Example 57 |
| --- | --- | --- | --- | --- | --- |
| $Eu_2O_3$ | 0.0 g | 0.176 g | 0.352 g | 1.760 g | 3.52 g |
| (moles of Eu/mole phosphor) | (0.0) | (0.005) | (0.01) | (0.05) | (0.10) |
| Brightness ($\mu W/cm^2$) | 0.35 | 9.398 | 12.28 | 27.000 | 29.394 |

The samples were prepared using the method of Examples 48–52. Although a mildly reducing furnace atmosphere is preferred, these phosphors may also be synthesized in air. XRD analysis found the samples to be essentially pure fluorophlogopite. The phosphor samples were evaluated for luminescence by exciting them with CR radiation. Under CR excitation, the europium-activated fluorophlogopite samples were blue emitting with line emissions at 360 and 390 nm due to $Eu^{+2}$. No red $Eu^{+3}$ emissions were observed even for the air fired phosphors. The sample having 0.10 moles of europium per mole of fluorophlogopite had the greatest brightness.

EXAMPLES 58–62

UV-blue emitting zirconium-activated fluorophlogopite phosphors having the general formula $KMg_3(Si_3Al)O_{10}F_2:Zr$ were prepared by forming a mixture of potassium carbonate ($K_2CO_3$, 4.70 grams), aluminum oxide ($Al_2O_3$, 10.20 grams), magnesium oxide (MgO, 24.19 grams), silicon dioxide ($SiO_2$, 32.02 grams) and potassium hexafluorosilicate ($K_2SiF_6$, 14.75 grams) and varying amounts of zirconium oxychloride octahydrate ($ZrOCl_2 \cdot 8H_2O$) in amounts calculated to yield zirconium activator concentrations of 0, 0.01, 0.04, 0.08, and 0.15 moles of zirconium per mole of fluorophlogopite. The amounts of zirconium oxychloride used are given in the following table.

|  | Example 58 | Example 59 | Example 60 | Example 61 | Example 62 |
| --- | --- | --- | --- | --- | --- |
| $ZrOCl_2 \cdot 8H_2O$ | 0.0 g | 0.6445 g | 2.578 g | 5.156 g | 9.667 g |
| (moles of Zr/mole phosphor) | (0.0) | (0.01) | (0.04) | (0.08) | (0.15) |
| Brightness ($\mu W/cm^2$) | 0.5126 | 0.5250 | 0.5538 | 0.6179 | 0.6624 |

Although zirconium oxychloride was selected as the source of the zirconium activator, it is anticipated that other sources of zirconium such as zirconium oxide could also be used.

The mixture was then blended on a mechanical blender for 20 minutes until uniformly mixed. The uniform mixtures were charged into covered alumina crucibles and fired in air in an electric furnace at about 1200° C. for about 12 hours to form a fired cake. The actual firing program used involved increasing the furnace temperature from 1100° to 1200° C. over a period of 1.5 hours, holding the temperature at 1200° C. for 12 hours and decreasing the furnace temperature from 1200° to 250° C. over a period of 1.0 hours. After cooling to room temperature, the fired cakes were then pulverized, washed, if necessary, and sieved through at least a –200 mesh screen to obtain the finished phosphor. XRD analysis showed the samples to be essentially pure fluorophlogopite. All of the samples exhibited the typical platelet morphology normally observed for fluorophlogopite. The phosphor samples were evaluated for luminescence by exciting them with CR radiation. Under CR excitation, the zirconium-activated fluorophlogopite samples were UV-blue emitting with a broad band emission at 360 nm due to a zirconate charge transfer band. The sample having 0.15 moles of zirconium per mole of fluorophlogopite had the greatest brightness.

While there have been shown what are at present considered to be the preferred embodiments of the invention, it will be apparent to those skilled in the art that various changes and modifications can be made herein without departing from the scope of the invention as defined by the appended claims.

We claim:

1. A phosphor comprising a fluorophlogopite having the general formula $KMg_3(Si_3Al)O_{10}F_2$ activated with an activator selected from niobium, thulium and zirconium.

2. The phosphor of claim 1 wherein the activator is niobium.

3. The phosphor of claim 2 wherein the niobium is present in an amount from about 0.01 to about 0.05 moles per mole of phosphor.

4. The phosphor of claim 8 wherein the amount of niobium is about 0.05 moles per mole of phosphor.

5. The phosphor of claim 2 wherein 2.5 $Mg^{+2}$ ions are removed for each $Nb^{+5}$ ion to yield a general formula $KMg_{3-2.5x}Nb_x(Si_3Al)O_{10}F_2$ wherein x is from about 0.005 to about 0.20.

6. The phosphor of claim 5 wherein x is about 0.10.

7. The phosphor of claim 2 wherein 3 $Li^{+1}$ ions are added and 4 $Mg^{+2}$ ions are removed for each $Nb^{+5}$ ion to yield the general formula $KMg_{3-4x}Nb_xLi_{3x}(Si_3Al)O_{10}F_2$ wherein x is from about 0.005 to about 0.20.

8. The phosphor of claim 7 wherein x is about 0.04.

9. The phosphor of claim 1 wherein the activator is zirconium.

10. The phosphor of claim 9 wherein the zirconium is present in an amount from about 0.01 to about 0.15 moles per mole of phosphor.

11. The phosphor of claim 10 wherein the amount of zirconium is about 0.15 moles per mole of phosphor.

12. The phosphor of claim 1 wherein the activator is thulium.

13. The phosphor of claim 12 wherein the thulium is present in an amount from about 0.005 to about 0.20 moles per mole of phosphor.

14. The phosphor of claim 13 wherein the amount of thulium is about 0.005 moles per mole of phosphor.

15. A phosphor comprising a sodium fluorophlogopite having the general formula $NaMg_3(Si_3Al)O_{10}F_2$ activated with europium or niobium.

16. The phosphor of claim 15 wherein the activator is niobium and 2.5 $Mg^{+2}$ ions are removed for each $Nb^{+5}$ ion to yield a general formula $NaMg_{3-2.5x}(Si_3Al)O_{10}F_2:Nb_x$ wherein x is from 0.01 to 0.08.

17. A phosphor comprising a layered perovskite having the general formula $KLaNb_2O_7$ activated with europium or samarium.

18. A phosphor comprising a layered perovskite having the general formula $KCa_2Nb_3O_{10}$ activated with europium.

19. A phosphor comprising a layered perovskite having the general formula $K_2La_{2-x}Gd_xTi_3O_{10}$ activated with europium wherein x is from 0 to 0.12.

20. The phosphor of claim 17 wherein the activator is europium.

21. The phosphor of claim 20 wherein the europium is present in an amount from 0.005 to 0.04 moles per mole of phosphor.

22. The phosphor of claim 21 wherein the amount of europium is 0.01 moles per mole of phosphor.

23. The phosphor of claim 17 wherein the activator is samarium.

24. The phosphor of claim 23 wherein the samarium is present in an amount from 0.005 to 0.06 moles per mole of phosphor.

25. The phosphor of claim 24 wherein the amount of samarium is 0.03 moles per mole of phosphor.

26. The phosphor of claim 18 wherein the europium is present in an amount from 0.005 to 0.04 moles per mole of phosphor.

27. The phosphor of claim 26 wherein the amount of europium is 0.005 moles per mole of phosphor.

28. The phosphor of claim 29 wherein the europium is present in an amount from 0.005 to 0.05 moles per mole of phosphor.

29. The phosphor of claim 28 wherein x is 0 and the amount of europium is 0.02 moles per mole of phosphor.

30. The phosphor of claim 28 wherein x is 0.012 and the amount of europium is 0.04 moles per mole of phosphor.

31. The phosphor of claim 16 wherein the amount of niobium is 0.08 moles per mole of phosphor.

32. The phosphor of claim 15 wherein the phosphor is activated is europium.

33. The phosphor of claim 32 wherein the europium is present in amount from 0.02 to 0.10 moles per mole of phosphor.

34. The phosphor of claim 33 wherein the europium is present in amount from 0.04 to 0.05 moles per mole of phosphor.

* * * * *

UNITED STATES PATENT AND TRADEMARK OFFICE
CERTIFICATE OF CORRECTION

PATENT NO : 5,531,928
DATED : July 2, 1996
INVENTOR(S): Karam et al.

It is certified that error appears in the above-identified patent and that said Letters Patent is hereby corrected as shown below:

Column 16, Line 13, "4. The phosphor of claim 8" should read -- 4. The phosphor of claim 3--.

Column 17, line 6, "28. The phosphor of claim 29" should read --28. The phosphor of claim 19--.

Signed and Sealed this

Thirty-first Day of March, 1998

Attest:

BRUCE LEHMAN

Attesting Officer　　　　Commissioner of Patents and Trademarks